(12) United States Patent
Campbell et al.

(10) Patent No.: US 8,495,105 B2
(45) Date of Patent: Jul. 23, 2013

(54) CONSOLIDATING INPUT MESSAGES FOR SOCIAL ACTIVITY SUMMARIZATION

(75) Inventors: Steve R. Campbell, Lillington, NC (US); Jason A. Collier, Raleigh, NC (US); Zeynep Latif, Raleigh, NC (US); Michael J. McMahon, Apex, NC (US); Michael B. Rutherford, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 544 days.

(21) Appl. No.: 12/644,738

(22) Filed: Dec. 22, 2009

(65) Prior Publication Data
US 2011/0153686 A1    Jun. 23, 2011

(51) Int. Cl.
*G06F 7/00* (2006.01)
*G06F 17/30* (2006.01)

(52) U.S. Cl.
USPC .................... 707/811; 705/319; 709/206

(58) Field of Classification Search
None
See application file for complete search history.

(56) References Cited

U.S. PATENT DOCUMENTS

| | | | |
|---|---|---|---|
| 6,233,253 B1 | 5/2001 | Settle et al. | |
| 7,031,348 B1 | 4/2006 | Gazit | |
| 7,680,888 B1* | 3/2010 | Marmaros et al. | 709/206 |
| 2003/0233661 A1 | 12/2003 | Fisher et al. | |
| 2005/0262214 A1* | 11/2005 | Bagga et al. | 709/207 |
| 2006/0015923 A1* | 1/2006 | Chuah et al. | 725/135 |
| 2006/0031317 A1* | 2/2006 | Lin et al. | 709/206 |
| 2006/0165379 A1* | 7/2006 | Agnihotri et al. | 386/95 |
| 2007/0032244 A1* | 2/2007 | Counts et al. | 455/456.1 |
| 2007/0214141 A1* | 9/2007 | Sittig et al. | 707/7 |
| 2008/0198230 A1* | 8/2008 | Huston | 348/157 |
| 2009/0106059 A1* | 4/2009 | Megiddo et al. | 705/7 |
| 2010/0048187 A1* | 2/2010 | Sullivan | 455/414.3 |
| 2010/0298055 A1* | 11/2010 | Kouhi | 463/43 |

OTHER PUBLICATIONS

IBM-; "Method and System for Event Driven Components Coupling"; IP.COM/IBM TDB; Oct. 2, 2007.
Wu-et al.; "High-Performance Complex Event Processing Over Streams"; ACM Digital Library; pp. 407-417; Jun. 2006.
Dittrich-et al.; "AGILE: Adaptive Indexing for Context-Aware Information Filters"; ACM Digital Library; pp. 215-225; Jun. 2005.
Kaneda-et al.; "A Challenge for Reusing Multiplayer Online Games Without Modifying Binaries"•, ACM Digital Library: pp. 1-10; Oct. 2005.

* cited by examiner

*Primary Examiner* — Robert Beausoliel, Jr.
*Assistant Examiner* — Susan F Rayyan
(74) *Attorney, Agent, or Firm* — Thomas E. Lees, LLC

(57) ABSTRACT

Social activity content is aggregated for summarization and reporting by obtaining a plurality of input messages that each characterizes a corresponding time limited social activity, such as a sporting event, competition, etc. Each received message is associated with a corresponding social activity, information is extracted from the received messages describing an aspect of the corresponding social activity and information is generated that summarizes the corresponding social activity. Generated information may be based upon a combination of the information extracted from the associated messages, and information derived from content based assumptions utilizing knowledge of the corresponding social activity. Social activity information is further aggregated by applying context aware filtering to eliminate redundantly generated information, sequencing the filtered information into a chronology of the social activity and generating a summary of the social activity based upon the sequenced and filtered information.

22 Claims, 5 Drawing Sheets

CONSOLIDATING INPUT MESSAGES FOR SOCIAL ACTIVITY SUMMARIZATION

BACKGROUND

The present invention relates to frameworks for conveying information, and more specifically, to the centralized consolidation of input messages for social activity summarization and for reporting of the summarized activities.

Individuals have long enjoyed observing social activities such as sporting competitions and other spectator events. However, in the current climate of busy schedules, obligations and time constraints, certain people are finding a difficult time in attending all of the spectator events that are of interest to them. In this regard, trends are emerging where parents, family and friends who are attendees of social activities are periodically calling or texting messages to their friends and family members to provide updates to the social activity, e.g., to provide the scores and/or play status of a corresponding ongoing sports event. This trend is emerging as a particularly prevalent pattern with regard to social activities including amateur sports, children's athletics, non-professional sports including recreational league sports, school sports and other social activities where timely updates are not otherwise available.

For friends, family members and other interested parties who are not attending the social activity, but who desire to receive current and/or frequent updates related to the status of the social activity, it is frustrating and anxiety-provoking to have to wait for long periods for the friend or family member attendee to call or send a text message with an update. Moreover, frustration on the part of the non-attendee can arise, for example, where the friend or family member in attendance misses or otherwise fails to provide an update to an important event, such as an important play or call. Still further, a non-attendee may not have friends or family that are in attendance and/or who are capable of providing updates.

Another characteristic of the trend towards spectators providing real time updates to family and friends who cannot be in attendance, is that numerous attendees are likely to be independently sending updates to different recipients. Thus, such updates are conventionally implemented in a one-to-one type communication. As a result, even though updates are constantly being transmitted for a given social activity, most individuals are not able to get constant, current and/or complete updates.

BRIEF SUMMARY

According to various aspects of the present invention, methods and computer program products are provided to aggregate social activity content for summarization and reporting. The social activity content is aggregated by obtaining, e.g., by a processing engine executing on a server computer, a plurality of input messages. Each obtained input message has content that characterizes at least one aspect of a corresponding time limited social activity, such as a sporting event, competition, etc. Social activity content is further aggregated by associating the plurality of input messages according to their corresponding social activity, by extracting from each obtained input message, the content characterizing at least one aspect of the corresponding social activity and by generating, e.g., by a processing engine executing on a server computer, summary information that summarizes at least one social activity.

Generation of summary information for each summarized social activity may be based, for example, upon a combination of: selected information from the extracted content of at least one input message associated with the corresponding social activity, and derived information from content based assumptions utilizing knowledge of the corresponding social activity and selected content associated with the corresponding social activity. Social activity content is further aggregated by generating a collaborative chronicle of each summarized social activity by: applying, e.g., by the processing engine, context aware filtering so as to eliminate redundant summary information associated with the social activity and by sequencing the filtered summary information into a chronology of the social activity, such that the generated summary of the social activity is based upon the sequenced and filtered summary information.

According to further aspects of the present invention, a computer program product to aggregate social activity content comprises a computer readable storage medium having computer readable program code embodied therewith. The computer readable program code comprises computer readable program code configured to iteratively process input messages, each obtained input message having content characterizing at least one aspect of a corresponding time limited, social activity. In this regard, the computer readable program code further comprises computer readable program code configured to extract context information from the obtained input message to determine whether the corresponding social activity is currently being monitored. The computer program product further comprises computer readable program code configured to create a new social activity summary if the corresponding social activity is not currently being monitored. Otherwise, the computer program product associates the obtained input message with the corresponding social activity.

Still further, the computer program product further comprises computer readable program code configured to extract from the obtained input message, the content characterizing at least one aspect of the corresponding social activity and aggregate the extracted content with any previously extracted content associated with the corresponding social activity. The computer program product further comprises computer readable program code configured generate summary information that summarizes the corresponding social activity based upon at least one of: selected information from the aggregated content associated with the corresponding social activity, and derived information from content based assumptions utilizing knowledge of the corresponding social activity and selected content associated with the corresponding social activity.

The computer program product still further comprises computer readable program code configured to apply context aware filtering so as to eliminate redundant summary information, computer readable program code configured to sequence the filtered summary information into a chronology of the social activity, and computer readable program code configured to generate a collaborative chronicle of the social activity based upon the sequenced and filtered summary information.

DETAILED DESCRIPTION

According to various aspects of the present invention, systems, methods and computer program products are provided that collect and consolidate multiple input messages to summarize and report on social activities.

In an exemplary implementation, a processing engine is provided for generating information about social activities, such as by utilizing logic and intelligence to collate, sequence and filter data extracted from multiple sources with regard to social activities. Moreover, as will be described in greater detail herein, the processing engine can generate information, e.g., the processing engine can infer or otherwise create content based upon information learned across one or more input messages, such as by deriving content based assumptions relative to an associated social activity. The processing engine thus utilizes the information extracted from the input messages along with content that it may generate to build a summary of a corresponding social activity.

According to further aspects of the present invention, the processing engine provides centralized processing of information pertaining to duration bound, i.e., time limited social events, such as sporting competitions and other spectator and/or observer attended social activities. In an illustrative implementation, the processing engine receives real-time or near real time input messages, where each input message contains an account of one or more events that was reported by a spectator and/or observer of a limited duration social activity such as a sports game. The processing engine applies information extracted from the received input messages into a collaborative characterization of the corresponding social activity, e.g., in the form of a chronologically sequenced summary of the game. As such, those not able to attend a corresponding monitored activity can obtain real-time or near real-time updates as the activity plays out.

The processing engine further provides output reporting of the summarized social activities. Accordingly, for example, the processing engine can receive information associated with a sporting activity from fans, spectators, etc., and use the collected information to update scores, statistics and other relevant information for distribution to those interested in the monitored sporting activity, e.g., individuals that cannot attend the associated activity and/or individuals that cannot otherwise focus attention on the associated activity. In this manner, the centralized processing engine serves as an intermediate to process and filter information in a many to many communications model. Many other examples and details will come to light in view of the details provided herein.

Figure 1:
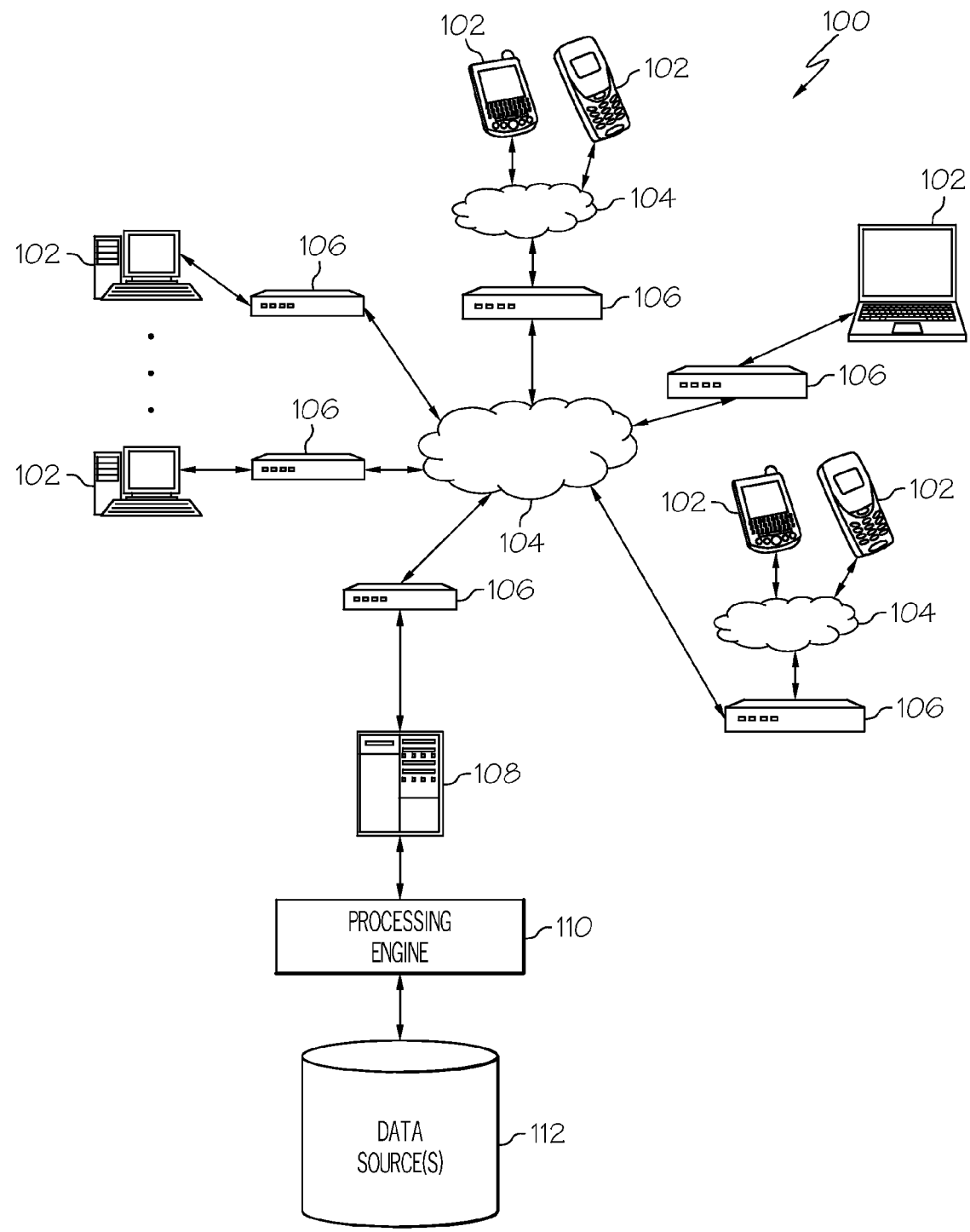
FIG. 1 is a schematic illustration of an exemplary computer system having a processing engine that implements social activity summarization according to various aspects of the present invention.

Referring now to the drawings and particularly to FIG. 1, a general diagram of a computer system 100 is illustrated according to various aspects of the present invention. The computer system 100 comprises a plurality of hardware and/or software processing devices, designated generally by the reference 102 that are linked together by a network 104. Typical processing devices 102 include for example, personal data assistant (PDA) processors, palm computers, cellular devices including cellular mobile telephones, and smart telephones. The processing devices 102 may also comprise netbook computers, notebook computers, personal computers, servers, transactional systems, purpose-driven appliances, special purpose computing devices and/or other devices capable of communicating over the network 104.

The network 104 provides communications links between the various processing devices 102, and may be supported by networking components 106 that interconnect the processing devices 102, including for example, routers, hubs, firewalls, network interfaces, wired or wireless communications links and corresponding interconnections, cellular stations and corresponding cellular conversion technologies, e.g., to convert between cellular and tcp/ip, etc. Moreover, the network 104 may comprise connections using one or more intranets, extranets, local area networks (LAN), wide area networks (WAN), wireless networks (WIFI), the Internet, including the world wide web, and/or other arrangements for enabling communication between the processing devices 102, in either real time or otherwise, e.g., via time shifting, batch processing, etc.

The illustrative system 100 also includes a server 108, e.g., a web server, file server, and/or other processing device that supports a processing engine 110 and a corresponding data source 112. The processing engine and data source 112 provide centralized social activity aggregation and summarization as described in greater detail herein. In an exemplary implementation, the server 108 is a web server that stores or otherwise manages information such as network-retrievable web pages in data source 112. In this manner, conventional web browsers may be executed on the various processing devices 102 to retrieve desired content from the network 104, such as by identifying to the corresponding server 108, a unique URL for the associated content stored in the data source(s) 112. The server 108 may also schematically represent one or more servers, each server performing a different function. For instance, the server 108 may comprise any combination of web servers, file servers, back-end processing servers, etc., as is necessary to support the functionality of the processing engine 110. The system 100 is shown by way of illustration, and not by way of limitation, as a computing environment in which various aspects of the present invention may be practiced.

According to various aspects of the present invention, the processing engine 110 is configured to obtain, e.g., receive or otherwise take in, real-time or near real time input messages from one or more of the processing devices 102. Depending upon the particular implementation, the input messages may be communicated to the processing engine 110 via email, Short Message Service (SMS) messages, PIN messages, Multimedia Messaging Service (MMS) messages, instant message system messages and/or other forms of cellular, telephone, or computer network communicated messages. The input messages may also and/or alternatively be provided to the processing engine 110 via a web interface, e.g., as may be implemented in a web browser, a mobile web application, a specialized applet and/or a software agent that is executed by a corresponding processing device 102. As such, the processing engine 110 can receive input messages from a plurality of different processing devices 102 at different geographical locations with regard to one or more different social activities. As such, according to various aspects of the present invention, the processing engine 110 creates summaries of time limited social activities using a many to many communications model.

Figure 2:
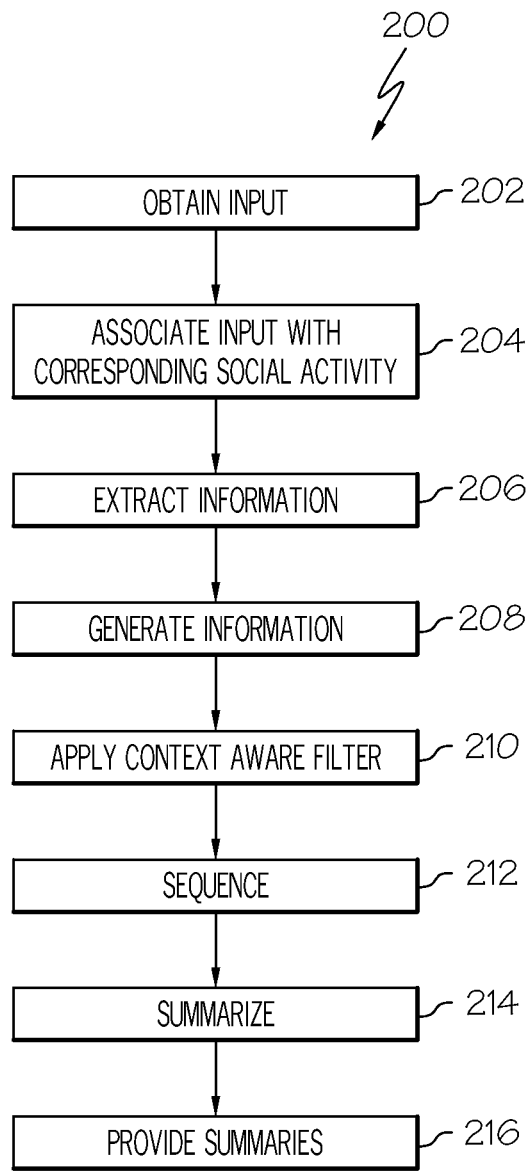
FIG. 2 is a flow chart of social activity summarization according to various aspects of the present invention.

Referring to FIG. 2, a method 200 is illustrated, for aggregating social activity content. The method 200 includes obtaining at 202, a plurality of input messages, each obtained input message having content characterizing at least one aspect of a corresponding time limited social activity. In an illustrative implementation, the input messages are obtained by the processing engine 110 executing on the server computer 108. The method 200 further comprises associating the plurality of input messages according to their corresponding social activity at 204. For example, the processing engine 110 may also be utilized to associate each obtained input message with its corresponding social activity, examples of which are described in greater detail herein.

The method 200 further comprises extracting from each obtained input message, the content characterizing at least one aspect of the corresponding social activity at 206, and generating summary information that summarizes at least one social activity at 208. Each social activity's generated summary information can be based upon a combination of: selected information from the extracted content of at least one input message associated with the corresponding social activity, and/or from derived information from content based assumptions utilizing knowledge of the corresponding social activity and selected content associated with the corresponding social activity, e.g., content of the extracted information of the associated input messages. Examples of utilizing the processing engine 110 to extract and generate information at 206 and 208 are also described in greater detail herein.

Still further, the method 200 comprises generating a "collaborative chronicle" of each monitored and/or summarized social activity by applying context aware filtering at 210 so as to eliminate redundant summary information and sequencing the filtered summary information into a chronology of the social activity at 212. The generated collaborative chronicle at 214 may define, for example, a summary of the social activity having content based upon the sequenced and filtered information. The method 200 may further comprise providing the collaborative chronicle of each summarized social activity to sources that request the corresponding summary at 216. Again, examples of utilizing the processing engine 110 to filter, sequence, summarize and output information are described in greater detail herein.

Input Messages:

As noted in greater detail herein, each obtained input message provides social activity update information that is utilized by the processing engine 110 to generate and/or update corresponding social activity summaries, referred to herein as collaborative chronicles. The social activities are likely to include sporting and other spectator events, but may also comprise for example, competitions, conventions, recitals, auctions, tradeshows and/or other duration limited or duration bound activities where observers, attendees, spectators, etc., observe details and/or happenings of the corresponding social activity and report the observed information to the processing engine 110, e.g., in real time or near real time.

As noted above, each input message includes content that characterizes at least one aspect of a corresponding time limited social activity. These aspects are typically happenings of the social activity, but they need not be limited to such. For instance, input messages may include an account of an event that occurred during a corresponding social activity and/or document an observation of fact or provide other information that is associated with or otherwise relates to a corresponding social activity, e.g., an update to a score, a statistic, a team name etc.

Also, it is recognized that the same "event" within a given social activity, e.g., a key play in a sports game, may be observed by multiple individuals, each with their own perceptions, observations, bias, motivations etc. Each individual may thus represent an account of the same event in a different way. Moreover, each of the above multiple individuals may have access to different processing device 102 technologies and/or elect to update the processing engine 110 at different times. As such, the processing engine 110 may be capable of receiving or otherwise obtaining input messages in any number formats across multiple processing device technologies. Moreover, the processing device 110 may be further capable of detecting duplicate accounts of the same content across multiple obtained input messages, even without exact literal matches of the text of corresponding input messages. For instance, at a football game, a first spectator may submit an input message to the processing engine 110 that states: "failed to convert on third and short". Another spectator of the same football game may submit a message that states: "our defense stuffed them on third and short". Yet another spectator of the football game may submit an input message to the processing engine that states: "we were stopped just short of a first down". These three messages likely describe the same event. Therefore, the processing engine 110 recognizes the three messages as being different "accounts" of the same event or happening within the football game and will treat the data accordingly, even where the messages arrive at the processing engine 110 at slightly different times, e.g., due to propagation delays of various technologies and delays of the individuals to send the updates.

Still further, a given social activity, e.g., a sports game, may include a plurality of features or "topics" that are of interest. These topics are likely unique to the given broad classification of social activity, e.g., baseball, soccer, football, tennis, basketball, etc., have certain characteristics in common, e.g., a winner, a loser, etc. Moreover, certain topics may be unique to a given sport. Still further, topics may be unique to the given specific instance of the activity, e.g., match between two rival teams. As such, the processing engine 110 may summarize each social activity according to event topics, e.g., score, period, team statistics, individual competitor statistics, etc., that are context appropriate and/or relevant, examples of which will be further described herein.

As such, the processing engine 110 may receive any number of input messages, which may collectively cover an unbound number of event topics and/or data associated with those topics. Moreover, to make it convenient for the observer/spectator/attendee, the input messages may not be formatted or structured in any particularized way, e.g., the input messages may be conventional text based messages. Still further, the input messages are likely to be received by the processing engine 110 out of chronological sequence. Accordingly, as noted in greater detail herein, the processing engine 110 sequences the previously generated and filtered summary information into a chronology of the social activity, e.g., such that the generated summary of the social activity is based upon the sequenced and filtered summary information.

Moreover, users of the processing engine 110 can drive, steer, direct or otherwise influence which social activities are monitored, e.g., by sending social activity information to the processing engine 110. That is, unlike conventional web sites, where the provider selects the sport and the data that define the content of the web site, the present invention can be dynamically built by the community of users by virtue of the user provided input messages determining the monitored social activity, and/or by the input message content determining or otherwise steering at least a portion of the content included in the summaries.

Associating Input Messages with Corresponding Social Activities:

As noted in greater detail herein, the processing engine 110 applies content extracted from the received input messages into collaborative characterizations of corresponding social activities, which are made available as social activity summaries (collaborative chronicles). In creating these summaries, the processing engine 110 may receive information about a given duration-bound, social activity from one or more related and/or unrelated sources. The processing engine 110 thus builds over time, as complete a record as is reasonable given the content of the input messages associated with a given social activity and optionally, based upon other information derived by and/or obtained by the processing engine 110.

Figure 3:
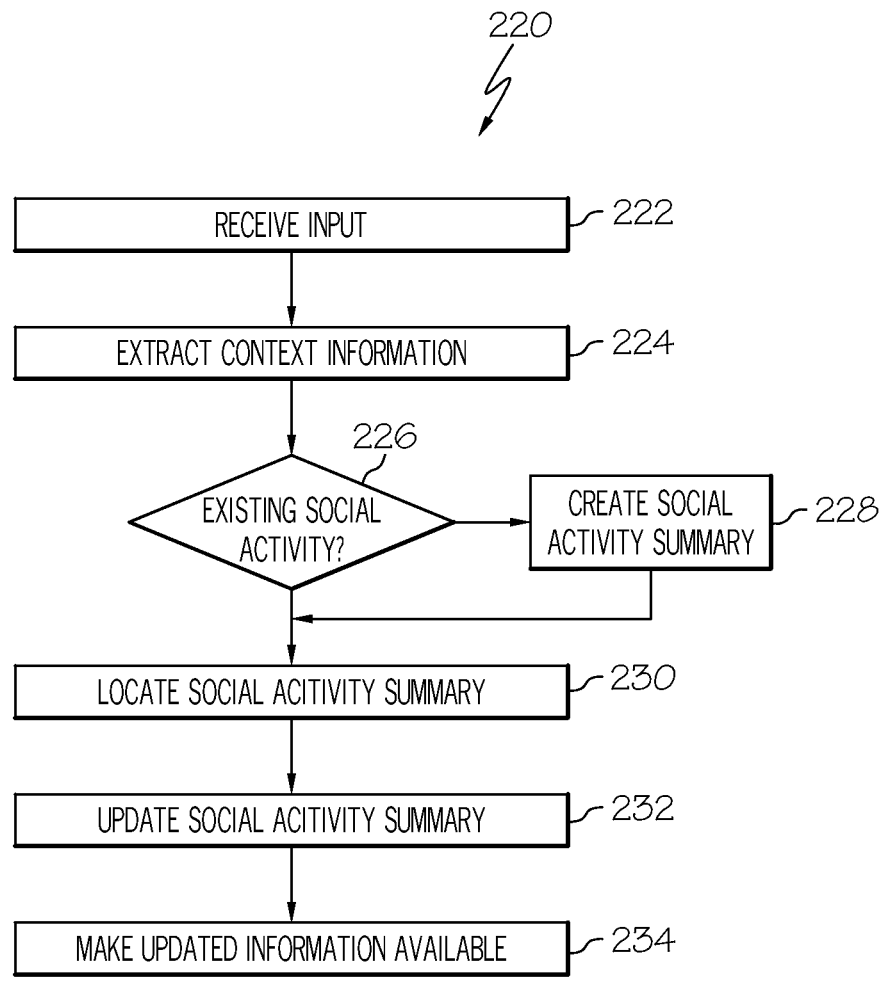
FIG. 3 is a flow chart illustrating an exemplary approach to associate input messages with corresponding social activities according to various aspects of the present invention.

Referring to FIG. 3, a flowchart 220 illustrates an exemplary processing flow of the processing engine 110 according to various aspects of the present invention. The processing engine 110, e.g., executing on the server computer 108, receives an input message at 222. As noted in greater detail herein, the input message may optionally be obtained by receiving the message, such as an email, text message, instant message, request or other message from a web browser or specialized client application, service, etc. Alternatively, the input message 222 may be received by polling, querying or otherwise obtaining the input message information from a suitable source, such as a queue, etc.

Context information is extracted from the input message at 224 and a determination is made at 226, based at least in part, upon the extracted context information, whether the obtained input message relates to an existing social activity being monitored or whether the obtained input message relates to a new social activity not currently being monitored by the processing engine 110.

The analysis of the context of the input message by the processing engine 110 may be based, at least in part, from the actual content of the input message and/or the context may be derived or otherwise inferred from additional information. For instance, an obtained input message may not expressly identify uniquely and/or unambiguously, the associated social activity. By way of example, an input message of "the score is tied 1 to 1" does not identify the unique occurrence of the social activity. This particular example does not even identify the sport. However, according to various aspects of the present invention, the processing engine 110 may associate an input message with a corresponding social activity based upon the processing engine 110 ascertaining the location of where a received input message was originated, e.g., based upon a global positioning location from a GPS device or other position determining information provided with the received information message. Thus, for example, the GPS coordinates of a processing device 102, such as a smart phone, may be sent along with an input message to the processing engine 110. The processing engine 110 may utilize the GPS coordinates to ascertain that the input message originated at an address associated with a known social activity, e.g., baseball field. As such, the processing engine 110 may conclude that the social activity is a baseball game.

Thus, according to various aspects of the present invention, a selected input message may be associated with a corresponding social activity by ascertaining the location of where a selected input message was originated and by determining that the sender of the corresponding selected input message is a spectator of a selected social activity associated with the ascertained location.

By way of illustration and not by way of limitation, context information such as message origin information, which may be utilized to associate (e.g., group, sort, organize, filter or otherwise relate) an input message with its corresponding social activity may also and/or alternatively, be identified based upon the name or other identification of a sender, a cellular telephone number of the sender such as the area code and/or exchange a subscriber account identification associated with the sender (if accounts are implemented), metadata in the input message, a cellular or other communication designation, a source address tag, etc. Thus, available data, regardless of whether intrinsic or extrinsic to the associated input message, may be evaluated to identify and/or gather clues as to the nature of the associated social activity.

As a further example, context information useful to identify a corresponding social activity may be expressly or implicitly derived from the content of the input message itself. Thus for instance, the input message may contain information that directly identifies the associated social activity, or the information may be implied from the content of the message.

If the context analysis indicates that the received input message relates to a new social activity, then a new social activity summary is created at 228. Optionally, the processing engine 110 may also create a new social activity summary if the context analysis cannot positively (or with sufficient certainty) associate the received input message with a corresponding existing social activity summary. If the received input message can be associated with an on-going social activity that is already being monitored, the appropriate social event is located, e.g., the appropriate social activity information is located at 230.

The social activity is updated at 232, e.g., by coalescing information generated from the received input message with existing data associated with the corresponding located social activity and the updated summary is made available at 234, as described in greater detail herein.

The term "social activity summary" refers broadly to a collection of information associated with a corresponding social activity. In this regard, the social activity summary may be a container, whether physical, logical, conceptual or otherwise, that associates, e.g., relates, links or otherwise aggregates, assembles or organizes information, which may be content extracted from input messages, information generated or otherwise derived or obtained by the processing engine, etc. The collaborative chronicle that the processing engine 110 makes available, is generated from selected information within the social activity summary, e.g., information that has been filtered and sequenced as described more fully herein.

Figure 4:
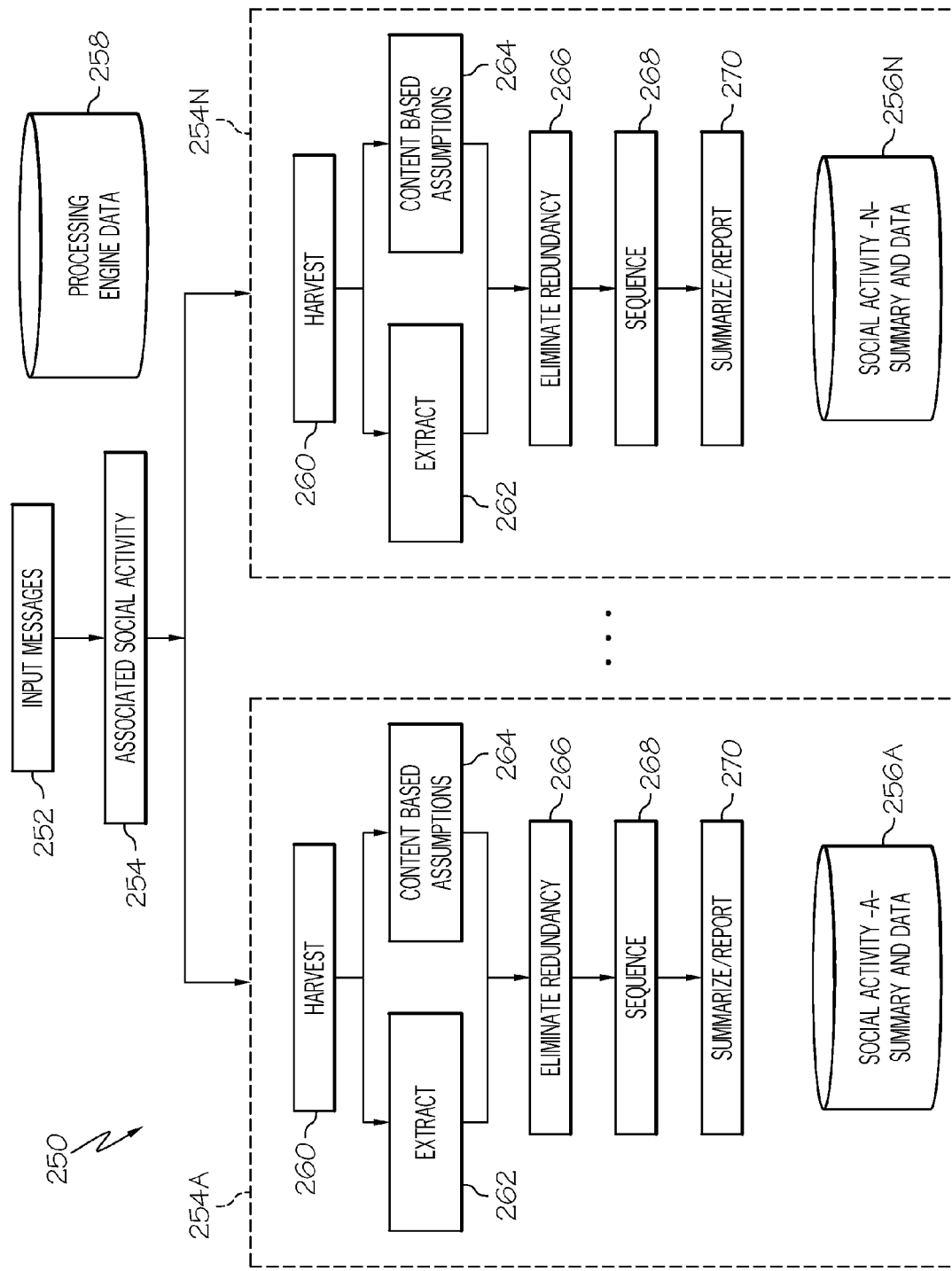
FIG. 4 is a flow chart illustrating an exemplary approach to harvesting information from obtained input messages according to various aspects of the present invention.

Harvesting/Generating Social Activity Information:

After the processing engine 110 has received an input message and has associated the input message with a corresponding social activity, the corresponding social activity summary is updated. Referring to FIG. 4, a process 250 illustrates an exemplary method of updating social activity summaries. The method 250 may be utilized, for example, to implement the update 232 of FIG. 3.

According to various aspects of the present invention, input messages 252 are each associated with a corresponding social activity 254, e.g., using a method such as set out with regard to FIG. 3. As schematically illustrated by the dashed boxes, the processing engine 110 is currently monitoring a plurality of social activities, labeled 254A through 254N.

In order to update the social activity summaries, the processing engine 110 determines or has previously determined the type or classification of social activity, e.g., baseball game, football game, tournament, etc., associated with the received input message. In this regard, the processing engine 110 may store relevant information in a corresponding storage 256 (see storage 256A-256N associated with corresponding social activities). For example, each data storage 256A-256N may store the generated social activity summary information, the received input messages associated with the social activity, metrics, and other details unique to or otherwise associated with the corresponding social activity. Further, the processing engine 110 may utilize data storage 258 to store rules, policies, libraries, definitions, classifiers and other data as necessary. In this regard, the storage 256A-256N, 258 may correspond to the data source(s) 112 of FIG. 1.

The processing engine 110 can harvest at 260, the appropriate information relevant to performing an update to the corresponding summary information. Harvesting of data may be performed by extracting from each obtained input message, content describing an aspect of the corresponding social activity at 262 and/or by generating information that summarizes the corresponding social activity based upon a combination of the extracted information from the associated input message (and/or other information extracted from other input messages) and information derived from content based assumptions at 264, e.g., utilizing knowledge of the corresponding social activity and/or the content of the extracted information of the associated input messages.

According to further aspects of the present invention, input messages are consolidated and/or evaluated against one another in order to arrive at a more simple message flow of events, e.g. by eliminating redundant and duplicative information. Moreover, information contained in each received input message may be incomplete, biased or incorrect. However, according to various aspects of the present invention, the processing engine is configured to aggregate, consolidate, coordinate, and correctly sort/order potentially imperfect pieces of data, e.g., by chronology as they pertain to one cohesive stream of message events. In this regard, according to various aspects of the present invention, the process engine may utilize context to provide message content validation, e.g., at least within the context of the given application, such as sporting event messages. In this regard, the processing engine 110 may extract at least one parameter of information from each received input message that is classified based upon parameters that are relevant to the associated social activity.

For instance, if the social activity is determined to be a sporting event, the processing engine 110 may utilize an understanding of the sport rules when evaluating input messages. As an example, a football game cannot have a score of 1-0. As such, the processing engine 110 can utilize a sports knowledge base to conclude that either the sport is not football, or the score asserted in the input message is wrong. The processing engine 110 may also utilizes an understanding of formatting, preferences, known abbreviations e.g., as stored in a sports database within the storage 258. The storage at 258 may also be utilized to store, slang, jargon, acronyms, expressions, etc., that are typical to the activity and/or to trends of individuals sending the input messages to the processing engine 110. This approach accounts for the practical realization that many individuals that send text messages, especially on mobile devices such as cellular telephones, use such short cuts to convey repetitive information. Still further, the storage 258 may store other knowledge to determine whether the input message provides an account of a detail, statistic or metric relevant to the corresponding summary.

As an example, the processing engine 110 may receive two input messages that are each determined to be associated with a social activity being monitored. Further, assume that the social activity is a baseball game and that a parameter relevant to the baseball game is the score. Assume that the first message indicates "the game is tied at 1 to 1". The processing engine 110 may classify "1 to 1" as the score, as this input message includes all of the necessary information to ascertain the score of the baseball game. Note that the message does not include the literal word "score". However, the processing engine 110 can make a content based assumption that the message contains the score based upon knowledge of baseball, and/or based upon general sports knowledge, e.g., as stored in one or more of the data sources 256, 258. For instance, the term "tied" may trigger the processing engine 110 to assume that the message includes the score. Other methods could alternatively be used to extract an understanding that the score is contained in the message, e.g., based upon the expression 1 to 1, etc.

The second message may state "visitors just hit in another run". In response to this message, the processing engine 110 can draw several conclusions. The account of the game described in the second message likely occurred at some time after the account of the game described in the first message because the second message uses the expression "another run". Since the previous message said the score was tied at 1 to 1, "another run" likely happened subsequent to scoring the first run. In this example, the context of the second message was contingent upon knowledge gained in a previous message. Thus, in this example, a previous message was utilized to contextualize the second message. In practice, the processing engine 110 may look at any number of previous messages and/or other stored data to make the appropriate updates, e.g., by evaluating at least two input messages together as a whole to derive summary information.

Use of the term "run" also provides further confidence that the game is in fact, a baseball game, as "run" is a term used in baseball to denote a score. Also, it is common in baseball for the visiting team to be listed before the home team. As such, the processing engine 110 may update the score in its summary to 2-1. Still further, depending upon the level of detail being tracked, the processing engine 110 further knows that at the time that the second account of the game was sent to the processing engine 110 via the second input message, the visitors were at bat. Again, this information may be determined based upon an understanding of the rules of baseball, an understanding of sports in general, the content of each message and/or other generalizations or drawn conclusions, e.g., by the processing engine 110 extracting such information from one or more of the data sources 256, 258.

The processing engine may further eliminate redundant information for a given group of received input messages at 266. For example, referring back to a previous example, assume that three input messages are received by the processing engine 110 and are determined to be associated with social activity 256N. Further, assume that social activity 256N is determined to be a football game.

A first spectator of the football game submits an input message to the processing engine 110 that that provides an account of an event that states "failed to convert on third and short". Another spectator of the same football game, e.g., as determined by GPS coordinates sent with the second input message, or by other suitable means, submits a message to the processing engine 110 that provides an account of the same event that states "our defense stuffed them on third and inches". Yet another spectator of the football game may submit an input message to the processing engine 110 that provides yet a different account of the same event that states "John was stopped just short of a first down". These three messages likely describe the same event. As such, the processing engine 110 may recognize the three input messages as being different "accounts" of the same event or happening within the football game and will treat the data accordingly.

For instance, the processing engine may store all three accounts in the data storage 256N, but add only a single entry to the social activity summary that identifies the failure to convert on 3rd down. As another example, the processing engine 110 may optionally add a detail to the social activity summary that indentifies "John" as a ball handler. In this regard, the processing engine 110 applies context aware filtering to the information it has available so as to eliminate redundantly generated information, e.g., multiple accounts of the same event, statistic, result, etc. As such, the processing engine 110 may be required to eliminate redundant information received from or otherwise derived from incoming messages coming from multiple sources.

The processing engine 110 also sequences the filtered information into a chronology of the social activity at 268 so that the summary reflects the most up to date information. The sequence information at 268 may also be useful, for example, so that the processing engine 110 can determine the end of the social activity, e.g., based on type of sport, message context, and reported score and/or based upon information or knowledge outside of the content of a message, e.g., based upon an understanding of sports rules, a clock or other time keeping mechanism, etc. A collaborative chronicle is provided at 270. As noted in greater detail herein, the collaborative chronicle at 270 may summarize and/or report the filtered and sequenced summary information. Moreover, more than one collaborative chronicle may be provided, e.g., to report summary information in various levels of detail, examples of which are set out in greater detail herein. Still further, the collaborative chronicles may be dynamically generated, e.g., on-demand, or the collaborative chronicles may be generated and reported, e.g., published as an update to a web page, etc.

The processing engine 110 further stores the updated information, including for example, the updated summary, any newly harvested information, updated details, metrics, statistics, etc., e.g., in the corresponding data storage 256. The summary generated by the processing engine may comprise records or fields of information that are particular to the corresponding social activity. However, there need not be a 1 to 1 relationship between received input messages and corresponding summary information. For instance, a single input message may contain sufficient information for the processing engine to populate multiple components of the associated summary. For instance, the processing engine may receive an input message that states "Vikings down by 3 with 1 minute remaining". The processing engine may know that the Vikings opponent has 17 points and that the event is a football game. As such, this single message tells the processing engine the current score (14-17) and the time remaining (1 minute). As yet another illustrative example, the processing engine may require two or more input messages to create even a single summary characteristic. For instance, in a baseball game, the processing engine may require a message "Bulldogs at bat" followed by a separate message "Wildcats at bat" to guess that a single inning has transpired.

Any number of triggers can generate an update to each social activity summary. For instance, updates may be triggered by receiving a corresponding input message containing additional (non-redundant) information. As another illustrative example, the processing device can create summary information from expected happenings, i.e.,—an inning ends, a quarter or period ends.

Presentation of Social Activity Summaries:

The processing engine 110 further provides social activity summary information as an output, e.g., as indicated at 216 of FIG. 2 and/or 234 of FIG. 3 and/or 270 of FIG. 4. The output may be implemented in any suitable manner, e.g., via push updates, instant messages, text messages, updates to a website suitable for browsers, Really Simple Syndication (RSS) or other syndicated news feeds, automated computer generated telephone calls to specific recipients or using other suitable techniques.

The processing engine 110 may utilize any suitable format to organize the summary information. For example, the processing engine 110 may utilize visual metaphors, graphics, charts, text or other visual representations of the summary information associated with a corresponding social activity to create a corresponding collaborative chronicle.

According to various aspects of the present invention, the processing engine creates new summary information based on the incoming data such that incoming updates produce a logical summary of real-time or near real-time game events. The summary information updates the collaborative chronicles, which can then be conveyed to interested recipients. For instance, the collaborative chronicles may be occasionally rebroadcast, thereby creating a news stream for consumption.

Illustrative Example:

By way of illustration and not by way of limitation, the processing engine 110 may be provided, which supports the ability to provide centralized sports event real-time input and output reporting for a many-to-many communication model. The illustrative processing engine 110 creates and updates a corresponding sporting event summary, potentially, for any type of sporting activity and for any league, team, or venue. In this regard, the processing engine 110 is further referred to in this illustrative example as a Sports Protocol Processing Engine (SPPE) 110A. The SPPE 110A takes in sports updates from many and varied input sources, e.g., processing devices 102 as set out in greater detail herein, e.g., cellular text messages, email, internet messages etc., which may be wirelessly transmitted to the SPPE 110A by spectators of the sporting activities as those observed games are being played.

Thus, the SPPE 110A implements a social activity protocol/network that uses context sensitive intelligence to extract appropriate social activity information to create and update social activity summaries of time/duration bound or otherwise limited activities. That is, the SPPE 110A serves as a "spotter" of social activities and journals information about the chronology of each activity by coalescing input messages that relate to the sports activity. Moreover, the SPPE 110A provides a many-to-many type of communication method where the efforts of many processing devices 102 are combined and coordinated so that the cooperative effect is to provide a more complete summary of the sports activity than any one processing device 102 could contribute. In this regard, unlike conventional social forums with topic threads, which typically display all messages in the order in which they were received, the SPPE 110A, according to various aspects of the present invention, employs context based logic to filter and sequence information.

The SPPE 110A harvests relevant data from the message context of input messages, and may provide various summary reporting formats as described more fully herein. In this regard, processing may utilize intelligence, algorithms and other logic to filter sports information, e.g., to distinguish redundant, duplicative and/or incorrect information, sequence generated information e.g., using inferential logic to derive context based assumptions used for reporting and summarizing associated sporting activities, as described more fully herein.

Conventional sports-based websites and software applications control both the selection of sports events to report, and the manner in which the data is conveyed. As such, these conventional sites are primarily targeted to mainstream conventional professional sports and do not provide regional, local and other coverage of amateur, minor, club, recreational and/or non mainstream sports.

To the contrary, various aspects of the present invention provide a processing engine such as the SPPE 110A, which updates sports and/or other social activities from information derived by potentially many individuals such as observers, spectators, etc. The recipients are thus able to obtain updates from a significantly broader array of social activities as described more fully herein.

An exemplary set of transactions are presented below to clarify certain described aspects set out in greater detail herein.

EVENT-MSG-1: A father attending a high school baseball game sends a text message from his cell phone 102 to the SPPE 110A indicating that it is the 1st inning and his son, John, got a double and knocked in the first run. He indicates in his message that the "Cougars" are now ahead by "1 to 0". This incoming message also contains GPS information.

In response to obtaining EVENT-MSG-1, the SPPE determines that the message is associated with a new sporting event, i.e., an event that is not currently being monitored. The SPPE may determine that the received message is associated with a new event based upon a number of factors. For instance, the SPPE 110A may identify that the received message is the first entry for the day having a GPS entry in the general vicinity that was received with the first input message. GPS coordinates are useful in a number of contexts. The SPPE 110A may simply associate the GPS coordinates with an event. As a further illustrative example, using the GPS coordinates, the SPPE 110A may determine that the message was sent from a high school. As such, the SPPE 110A may infer that the message was sent from a spectator of a high school sporting event.

Moreover, the SPPE 110A may know or be able to determine that the high school associated with the GPS coordinates is not the Cougars high school. As such, the SPPE 110A may infer further that the sender of the received message is a spectator of a high school sporting event and that the Cougars is a visiting team. The SPPE 110A may further know the mascot associated with the high school from which the first message is sent is the Panthers.

In this regard, the SPPE 110A may maintain a database of sporting events that it has previously monitored, e.g., by saving a history of data or other information learned by the SPPE 110A relative to the GPS coordinates or general location of the first message. The SPPE 110A may also and/or alternatively look up address information, locations etc., using for example, suitable mapping software, etc. The SPPE 110A may use further knowledge not associated with the message, e.g., the season, time, or other metrics to guess that the social activity is a sporting event, and that the sporting event is a baseball game. Moreover, GPS is merely an illustrative example of a message attribute that can be utilized to determine or otherwise guess social activity information.

The SPPE 110A also looks at the context of the received message and determines that this new sporting event is a baseball game since there are references in the message context to 'inning', 'double, and 'run'. The SPPE 110A also determines, based on reference to '1st inning', that this message is associated with early stages of the sporting event. Finally, it records the fact that the name of the current team in the lead is the "Cougars" and that "John" plays for the "Cougars".

EVENT-MSG-2: A mother of a high school player sends a message from her wireless laptop 102 to the SPPE 110A indicating that her son, Steve, just struck out at bat and they are now about to start the "2nd inning", and that their team is behind "0 to 1".

The SPPE 110A may treat the second message in a manner analogous to that previously described. Additionally, the SPPE 110A may further utilize GPS coordinates or other position/location relevant information sent by the wireless laptop 102. Still further, position and/or location information and/or additional information may be included in the Web application executing on the wireless laptop 102 that enables the SPPE 110A to determine that the second received message is associated with the sports event (baseball game in this example) that was first reported in Event-Msg-1. The SPPE 110A may also extract the player information for future reporting.

EVENT-MSG-3: A father of a player on the "Panthers" high school team sends a message from his cell phone 102 to the SPPE 110A indicating that his son, Jim, just "struck out" and that there are now "2 outs for the Panthers and no one on base".

Again, the SPPE 110A may utilize GPS information or other position determining capabilities to determine that the third message is associated with the sports event first reported in Event-Msg-1. The SPPE 110A is now able to derive the name of the opposing team for this sports event as the "Panthers" if such information had not already been derived. Thus, the SPPE 110A now knows that the Panthers are competing against the Cougars. Since the messages were sent from the Panthers high school, the SPPE 110A further guesses that the Panthers are the home team if such information had not already been derived. Since a Panther just struck out, the SPPE 110A can further guess that the sporting event is at the bottom of an inning. The SPPE 110A may further extract player information for future reporting.

EVENT-MSG-4: A friend of a player on the "Panthers' high school baseball team sends a message from an applet executing on his smart phone 102 to the SPPE 110A indicating that the "Panthers" just had their "3rd out" and it is "0 to 1" at the end of the "1st inning". Again, the SPPE 110A may utilize GPS or other position/location relevant information, e.g., in the fourth message to enable the SPPE 110A to relate the fourth message with the event first reported in Event-Msg-1. The SPPE 110A determines that the score status is redundant information from the previously obtained Event-Msg-2 and thus does not need to update that aspect of the summary.

EVENT-MSG-5: A mother of a boy on the Cougar's team logs into a web page associated with the SPPE 110A on her wireless netbook 102 to send a message to the SPPE 110A indicating that it is the 1st inning and her son, David, got a triple with a hit to right field. She indicates that the score is "0 to 0" with "2 outs". This incoming message also contains internet routing information suggesting that the message is related to the Cougars-Panthers game above. This message is the latest message received related to this sports event. However, the SPPE 110A determines that this event message is associated with an event that occurred earlier than events reported in the previous 4 update messages. The SPPE 110A is able to make this determination by deducing that the event occurred when the score was still "0 to 0". The SPPE 110A is also able to deduce that "David" plays for the Cougars and scored the first run (since he was on third with 2 outs when the score was still "0 to 0").

REQUEST-MSG-1: A parent of a player on the Cougars baseball team, who cannot attend the baseball game, sends a text message to the SPPE to get the current summary status of the Cougars' game. Assume for example, that the SPPE 110A receives the request message just after the 1st inning and after Event-Msg-1-Event-Msg-5 have been received. In response thereto, the SPPE 110A may send appropriate information back to the requestor as a collaborative chronicle providing currently stored state of the requested social activity. For instance, the SPPE 110A may send back to the requestor, information including the following summarized default game status:

---
Sports Event: ID-XXXX
Sports Type: baseball
Teams: Cougars - Panthers
Location: <address or field info derived from GPS>
Current State: 2nd inning
Score: Cougars: 1 Panthers: 0

---

In the illustrative example, the SPPE 110A sends a message including a unique event identification. While not required, such information may be useful, e.g., so that when the requestor requests another update, the particular event may be particularly identified. The response message may also include a description of the social activity, e.g., a Sport category of type Baseball. Still further, the SPPE 110A may provide additional information such as the teams in the sporting contest, the location of the sporting event, e.g., as derived from the received GPS coordinates, the latest known status of the event, e.g., $2^{nd}$ inning, and the score of the competition. The above information is merely representative and other and/or additional information may alternatively be provided. Moreover, the information may be formatted in any suitable format for communication back to the requestor.

Still further, the SPPE 110A may allow other options, e.g., to temporarily subscribe to updates. For instance, the SPPE 110A may be configured to allow a requestor to request receipt of updates every 10 minutes until the end of the competition. Alternatively, a requestor may only want to be notified when the score changes, when a particular player makes a play, when the final score in known, etc. Other arrangements may alternatively be implemented.

REQUEST-MSG-2: A parent of a player on the Panthers baseball team, who also cannot attend the baseball game, sends a text message to the SPPE 110A to get the current status of the Cougars' game. However, this parent does not want an abbreviated summary or synopsis, but rather, wants more details provided in the summary report.

The SPPE 110A receives the request message just after the 1st inning and after Event-Msg-1-Event-Msg-5 have been received and passes the requested detailed collaborative chronicle information back to the requestor. By way of example, the following default game status information may be communicated back to the requester:

---
Sports Event: ID-XXXX
Sports Type: baseball
Teams: Cougars - Panthers
Location: <address or field info derived from GPS>
Current State: 2nd inning
Score: Cougars: 1 Panthers: 0
Inning 1:
Hits: David (Cougars) _ Triple
John (Cougars) _ Double -continued RBIs: John (Cougars)
Struck Out: Jim (Panthers)
Steve (Panthers)
Inning 2:
<no information reported>

---

As noted above, in the illustrative example, the detailed response includes game statistics and/or other information collected by the SPPE 110A in addition to the basic time/location information and the score. In this regard, the nature of the social activity will likely dictate the metrics and/or statistics that are tracked by the SPPE 110A. Moreover, the SPPE 110A may include processing features that facilitate intelligent updating. For instance, the SPPE 110A may include detailed updates of only statistics that have changed since a previous update. Alternatively, multiple and/or alternative options may be provided to receive various levels of detailed information. Still further, information may be selectively provided, e.g., based upon the bandwidth and/or processing capabilities of the requesting processing device 102. For instance, a mobile telephone with a limited display may receive less information and/or abbreviated information that is presented differently that a processing device such as a laptop or desktop computer running a web browser due to the expanded graphics and display capabilities of such processing devices.

Various aspects of the present invention provide a "Real-time Sports Social Network" where message interaction is associated with the reporting/retrieving of active sports events. The processing engine 110A may be applied however, to any social activity as described in greater detail herein. Moreover, the general processing engine framework may be adapted to new social activities, e.g., new sports, etc., by accepting a hierarchy of specialized "Processing Plugins" to provide customized and specific processing/filtering functionality. Using the sports scenario described in herein, a generic processing engine 110 may contain a "Sports Protocol Processing Engine" plugin and this plugin would contain more specialized Processing Plugins that are specific for a given sport (e.g.—a plugin for baseball, volleyball, soccer, basketball).

Rules:

The processing engine 110 may support various processing schemes to update the currently monitored social activities. For instance, rules may be utilized to apply activity specific knowledge to received input messages. As an example, by understanding how long a typical instance of a sporting event lasts, and by knowing when the activity starts, e.g., based upon an input message, the processing engine can estimate when an associated sporting event should end and/or the processing engine can estimate the time remaining. The processing engine may utilize such information for prioritizing updates, for determining when to provide updates or other suitable uses.

The processing engine 110 may also utilize particularized knowledge, e.g., formulated as rules and/or guidelines and/or key terms of the monitored social activities to classify or otherwise organize the received input messages. For instance, by understanding that the game of baseball comprises nine innings and the game of football comprises four quarters, the processing engine can distinguish a message that says "the Cardinals are up 14-3 in the 4th quarter" as likely pertaining to a football game, e.g., as compared to a message that indicates "bottom of the 6th inning" as likely pertaining to a baseball game. The processing engine may further utilize rules and/or key words to distinguish social activities. For instance, expressions such as "at bat", "struck out", "walked", "double play", may be associated with a baseball game. Other exemplary terms and phrases may also and/or alternatively be implemented.

Moreover, the techniques described herein need not be implemented independently. For instance, finding multiple terms in a received message may be utilized to increase the confidence that the activity classification is correct. For instance, the input message "Hank hit a low and away curve ball for a double in the 7th inning" provides the processing engine with a information for several different characteristics of the corresponding activity. For instance, the processing engine can derive that Hank is a participant of the activity. Moreover, the processing engine can derive that Hank hit "a double", which may be associated with the sport of baseball, thus improving the confidence of identifying the correct sport.

Moreover, by understanding the rules of baseball, the processing engine may further deduce based upon the knowledge of a double, a parameter associated with a state of the activity, i.e., that a runner is on second base. Still further, the processing engine determines that Hank hit a low and away curve ball. Thus, the processing engine can harvest data that the pitcher for the opposite team as Hank's team can throw a curve ball. This information also further provides confidence that the activity is properly classified as baseball. Still further, the processing engine deduces that the runner on second base occurred in the 7th inning. Thus, again, the confidence of the correct classification of the sport as baseball is increased because "innings" are associated with baseball. However, the processing engine knows that the game is in the 7th inning and that a runner is on 2nd base. Notably, the message does not expressly indicate that a runner is on second base. However, the processing engine derives this information based upon the message indicating "a double".

Miscellaneous:

According to various aspects of the present invention, a framework is provided to take a series of incoming text messages (potentially coming from dozens or hundreds of different sources), process them for duplicates, use logic to harvest information and arrange extracted information by proper time and sequence, and produce a summary of the corresponding activity as events within the activity occur. Moreover, the framework is capable of creating new events and properly sequencing those created events based on incoming data rather than just merging together and displaying received information. The summaries are suitable for rebroadcast, thereby creating a news stream for consumption, as events of the activity occur.

According to further aspects of the present invention, a framework is provided, which supports the triggering of a processing component, e.g., the processing engine 110, by higher level accounts of events that occur during a social activity such as a sporting competition. The processing component detects a pattern, which may include a sequence of simple events, e.g., by stateful correlation processing combining information received or otherwise derived from an open ended (and possibly dynamic) number of producers submitting to a combination of independently defined event topics.

For any given tournament, game, match, or other social activity, there may be any number of observers or spectators such as parents or friends using wireless processing devices 102 to send updates to the processing engine. As noted in greater detail herein, these independent source streams of events provide near real time input messages to the processing engine 110 as the associated social activity takes place.

According to various aspects of the present invention, the processing engine 110 aggregates these input messages into a common, dynamically updating summary of the activity. This approach avoids the redundancies and incomplete reporting characteristic of conventional one-to-one type communication styles where spectators email or text only to their specific recipient. As such, various aspects of the present invention provide a framework and/or social network for dynamically sending or receiving updates on social activities such as sports, that is generic, e.g., for all sports and all teams and venues.

Thus, according to various aspects of the present invention, the processing engine 110 may accept inputs from any individual and from any location to create a summary for rebroadcast back to any individual at any location who wishes to receive rebroadcast updates. Moreover, the system harvests information from varied forms of text input (with varied formats) and applies sports or other suitable specific logic to establish meaning and order to the messages. According to various aspects of the present invention, received messages do not need to conform to any predefined message format or require pre-established fields and/or pre-established queries setup to look at these expected message formats. Rather, text based messages can be utilized by the participants sending input messages to the processing engine 110. Still further, the processing engine 110 makes available, summaries of activities created from expected happenings to produce stories arranged in the order that events occur, for rebroadcast, thereby creating a news stream for consumption.

Figure 5:
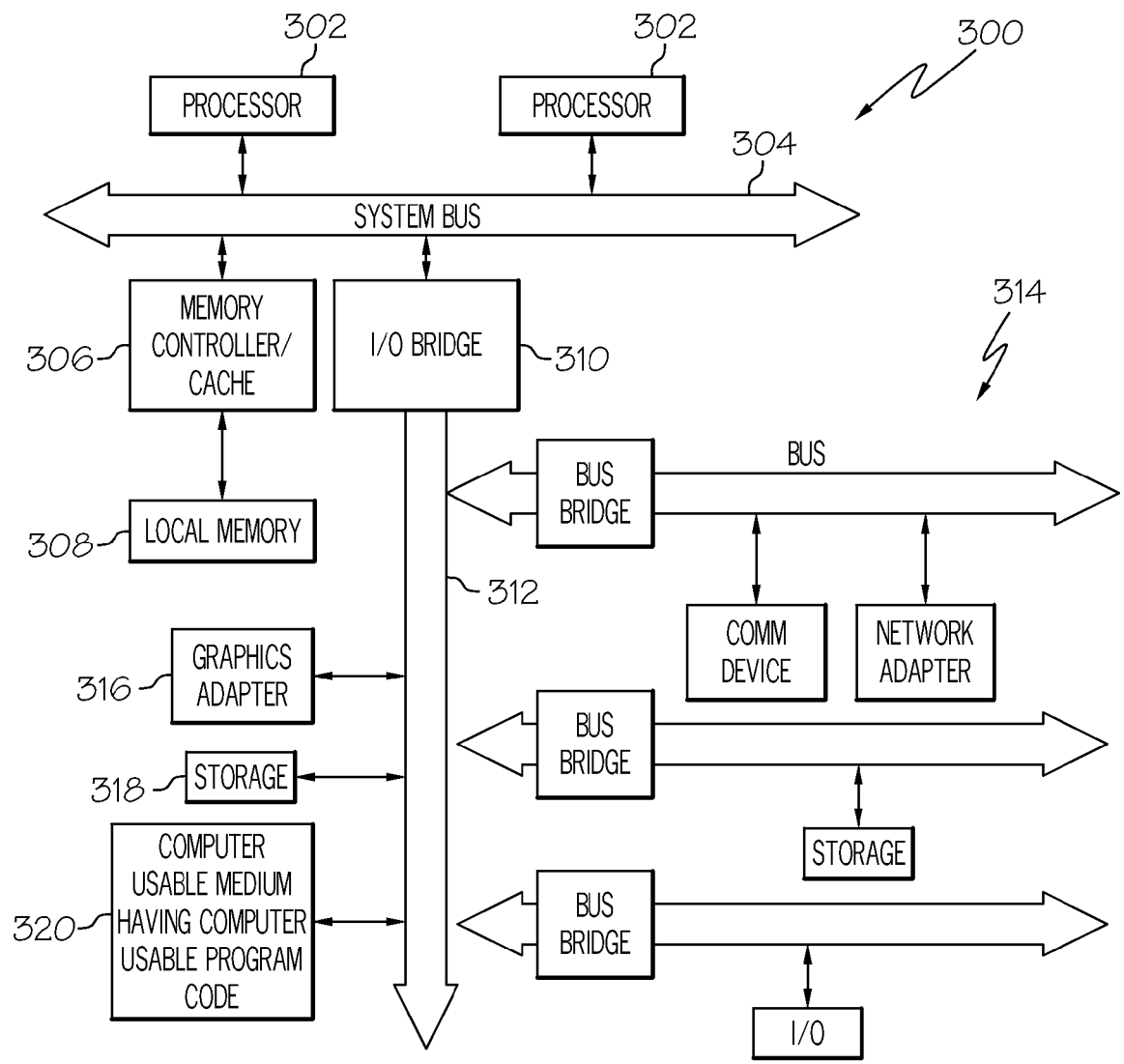
FIG. 5 is a block diagram of a computer system having a computer readable storage medium for implementing functions of the processing engine according to various aspects of the present invention.

Referring to FIG. 5, a block diagram of a data processing system is depicted in accordance with the present invention. Data processing system 300, such as the server 108 hosting the processing engine 110 described with reference to FIG. 1, may comprise a symmetric multiprocessor (SMP) system or other configuration including a plurality of processors 302 connected to system bus 304. Alternatively, a single processor 302 may be employed. Also connected to system bus 304 is memory controller/cache 306, which provides an interface to local memory 308. An I/O bus bridge 310 is connected to the system bus 204 and provides an interface to an I/O bus 312. The I/O bus may be utilized to support one or more busses and corresponding devices 314, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 316, storage 318 and a computer usable storage medium 320 having computer usable program code embodied thereon. The computer usable program code may be executed to implement any aspect of the present invention, for example, to implement any aspect of any of the methods and/or system components of the processing engine 110 illustrated in FIGS. 1-4. Moreover, the computer usable program code may be utilized to implement any other processes that are used to perform the social activity summarization and/or reporting, as set out further herein.

The data processing system depicted in FIG. 5 may comprise, for example, an IBM RS/6000 system, a product of International Business Machines Corporation in Armonk, N.Y., running the Advanced Interactive Executive (AIX) operating system. An object oriented programming system such as Java may run in conjunction with the operating system and provides calls to the operating system from Java programs or applications executing on data processing system.

The various aspects of the present invention may be embodied as systems, methods and computer program products. Also, various aspects of the present invention may take the form of an entirely hardware embodiment, an entirely software embodiment (including software, firmware, microcode, etc.) or an embodiment combining software and hardware, wherein the embodiment or aspects thereof may be generally referred to as a "circuit," "component" or "system." Furthermore, various aspects of the present invention may take the form of a computer program product embodied in one or more computer-readable storage medium(s) having computer-usable program code embodied thereon. Further, various aspects of the present invention may take the form of a computer program product accessible from a computer-usable or computer-readable medium providing program code for use by or in connection with a computer or any instruction execution system.

Any combination of one or more computer readable medium(s) may be utilized. As such, aspects of the present invention may be stored, implemented and/or distributed on any suitable computer usable or computer readable medium(s), which are stored together or distributed, either spatially or temporally across one or more storage devices. Moreover, the computer readable medium may be a computer readable signal medium or a computer readable storage medium.

A computer usable or computer readable medium may comprise, for example, but is not limited to, an electronic, magnetic, optical, electromagnetic, infrared, or semiconductor system, apparatus, device, or any suitable combination of the foregoing. As yet further examples, a computer usable or computer readable medium may comprise cache or other memory in a network processing device or group of networked processing devices such that one or more processing devices stores at least a portion of the computer program product. The computer-usable or computer-readable medium may also comprise a computer network itself as the computer program product moves from buffer to buffer propagating through the network. As such, any physical memory associated with part of a network or network component can constitute a computer readable medium.

More specific examples (a non-exhaustive list) of the computer usable or computer readable medium comprise for example, a semiconductor or solid state memory, magnetic tape or other magnetic storage device, an electrical connection having one or more wires, a swappable intermediate storage medium such as floppy drive or other removable and/or portable computer diskette, tape drive, a hard disk which may be portable or installed in a computer processing device, a rigid magnetic disk, a random access memory (RAM), a read-only memory (ROM), an erasable programmable read-only memory (EPROM or Flash memory), a portable compact disc read-only memory (CD-ROM), a read/write compact disk (CD-R/W) or digital video disk (DVD or DVD-R/W), an optical fiber, an optical storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in any suitable language, including for example, an object oriented programming language such as Java, Smalltalk, C++ or the like. Computer program code for carrying out aspects of the present invention may also and/or alternatively be written in conventional procedural programming languages, such as the "C" or similar programming language, or in higher or lower level programming languages. Program code may execute entirely on a single processing device, partly on one or more different processing devices, as a stand-alone software package or as part of a larger system, partly on a local processing device and partly on a remote processing device or entirely on the remote processing device, e.g., a server. In the latter scenario, the remote processing device may be connected to the local processing device through a network such as a local area network (LAN) or a wide area network (WAN), or the connection may be made to an external processing device, for example, through the Internet using an Internet Service Provider.

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams may be implemented by system components or computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable data processing apparatus, or other devices to produce a computer implemented process such that the instructions that execute on the computer, other programmable data processing apparatus, or other devices provide processes for implementing the functions/acts specified in the flowchart and/or block diagram block or blocks.

Computer systems programmed with instructions embodying the methods and/or systems disclosed herein, or computer systems programmed to perform various aspects of the present invention and storage or storing media that store computer readable instructions for converting a general purpose computer into a system based upon various aspects of the present invention disclosed herein, are also considered to be within the scope of the present invention. Once a computer is programmed to implement the various aspects of the present invention, including the methods of use as set out herein, such computer in effect, becomes a special purpose computer particular to the methods and/or program structures herein.

The flowchart and block diagrams in the Figures illustrate the architecture, functionality, and operation of possible implementations of systems, methods and computer program products according to various embodiments of the present invention. In this regard, one or more blocks in the flowchart or block diagrams may represent a component, segment, or portion of code, which comprises one or more executable instructions for implementing the specified logical function(s). In some alternative implementations, the functions noted in the blocks may occur out of the order noted in the figures. For example, two blocks shown in succession may, in fact, be executed substantially concurrently or in the reverse order, e.g., depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A method of aggregating social activity content comprising:
    obtaining a plurality of input messages, each obtained input message having unstructured content characterizing at least one aspect of a corresponding time limited social activity;
    associating the plurality of input messages according to their corresponding social activity;
    converting the unstructured content from each obtained input message into extracted unstructured content characterizing at least one aspect of the corresponding social activity;
    generating, by a processor, summary information that summarizes at least one social activity, each social activity's summary information based upon a combination of:
        selected information from the extracted unstructured content of at least one input message associated with the corresponding social activity, and
        derived information from content based assumptions utilizing knowledge of the corresponding social activity and selected unstructured content associated with the corresponding social activity to determine the context of the extracted content; and
    generating, by the processor, a collaborative chronicle of each summarized social activity by:
        applying context aware filtering so as to eliminate redundant obtained input messages associated with the social activity by consolidating the unstructured content of the redundant messages that represents the same information; and
        sequencing the filtered summary information into a chronology of the social activity independent of the order in which the input messages are received.

2. The method according to claim 1, wherein associating the plurality of input messages according to their corresponding social activity comprises:
    ascertaining the location of where a selected input message was originated; and
    determining that the sender of the corresponding selected input message is a spectator of a selected social activity associated with the ascertained location.

3. The method according to claim 2, wherein ascertaining the location of where a selected input message was originated comprises:
    receiving at least one of: global positioning information, at least a portion of a phone number, a sender's identification, identification of a subscriber account, metadata and a source address tag.

4. The method according to claim 1, wherein generating summary information that summarizes at least one social activity comprises:
    extracting at least one parameter of information from each received input message that is classified based upon parameters that are relevant to the associated social activity.

5. The method according to claim 1, wherein:
    obtaining a plurality of input messages comprises receiving an open ended plurality of input messages collectively obtained over a plurality of independently defined social activities; and
    generating summary information that summarizes at least one social activity further comprises detecting at least one of: a pattern and a sequence from associated input messages for each independently defined social activity.

6. The method according to claim 1, wherein generating summary information further comprises:
    receiving at least two input messages associated with a corresponding social activity; and
    evaluating the at least two input messages together as a whole to select content utilized to generate corresponding summary information representative of the at least two input messages.

7. The method according to claim 1, further comprising:
    utilizing at least one of:
        rules of a corresponding social activity; and
        at least one of: known abbreviations slang, jargon, and expressions that are typical to the activity,
        to provide the knowledge of the corresponding social activity utilized to derive any content based assumptions.

8. The method according to claim 1, wherein applying context aware filtering so as to eliminate redundant obtained input messages associated with the social activity by consolidating the unstructured content of the redundant messages, further comprises:

utilizing context aware processing to distinguish redundant information conveyed in multiple input messages as being separate accounts of the same event by utilizing knowledge of the associated social activity.

9. The method according to claim 1, further comprising:
automatically providing updates to requestors of a corresponding summary when a change occurs to at least one parameter tracked by the associated summary.

10. A computer readable storage device with an executable program stored thereon, wherein the program instructs a processor to perform:

obtaining a plurality of input messages, each obtained input message having unstructured content characterizing at least one aspect of a corresponding time limited social activity;

associating the plurality of input messages according to their corresponding social activity;

converting the unstructured content from each obtained input message into extracted unstructured content characterizing at least one aspect of the corresponding social activity;

generating summary information that summarizes at least one social activity, each social activity's summary information based upon a combination of:

selected information from the extracted unstructured content of at least one input message associated with the corresponding social activity, and derived information from content based assumptions utilizing knowledge of the corresponding social activity and selected unstructured content associated with the corresponding social activity to determine the context of the extracted content; and generating a collaborative chronicle of each summarized social activity by:

applying context aware filtering so as to eliminate redundant obtained input messages associated with the social activity by consolidating the unstructured content of the redundant messages that represents the same information; and sequencing the filtered summary information into a chronology of the social activity independent of the order in which the input messages are received.

11. The computer readable storage device of claim 10, wherein associating the plurality of input messages according to their corresponding social activity comprises:

ascertaining the location of where a selected input message was originated; and determining that the sender of the corresponding selected input message is a spectator of a selected social activity associated with the ascertained location.

12. The computer readable storage device according to claim 11, wherein ascertaining the location of where a selected input message was originated comprises:

receiving at least one of: global positioning information, at least a portion of a phone number, a sender's identification, identification of a subscriber account, metadata and a source address tag.

13. The computer readable storage device according to claim 10, wherein:

generating summary information that summarizes at least one social activity comprises:

extracting at least one parameter of information from each received input message that is classified based upon parameters that are relevant to the associated social activity.

14. The computer readable storage device according to claim 10, wherein:

obtaining a plurality of input messages comprises:

receiving an open ended plurality of input messages collectively obtained over a plurality of independently defined social activities; and generating summary information further comprises:

detecting at least one of: a pattern and a sequence from associated input messages for each independently defined social activity.

15. The computer readable storage device according to claim 10, wherein:

generating summary information further comprises:

receiving at least two input messages associated with a corresponding social activity; and evaluating the at least two input messages together as a whole to select content utilized to generate corresponding summary information representative of the at least two input messages.

16. The computer readable storage device according to claim 10, wherein the program further instructs the processor to perform:

utilizing a data source that stores at least one of:

rules of a corresponding social activity; and at least one of: known abbreviations slang, jargon, and expressions that are typical to the activity, to provide the knowledge of the corresponding social activity utilized to derive any content based assumptions.

17. The computer readable storage device according to claim 10, wherein applying context aware filtering so as to eliminate redundant obtained input messages associated with the social activity by consolidating the unstructured content of the redundant messages, further comprises:

utilizing context aware processing to distinguish redundant information conveyed in multiple input messages as being separate accounts of the same event by utilizing knowledge of the associated social activity.

18. The computer readable storage device according to claim 10, wherein the program further instructs the processor to perform: implementing a hierarchy of plug-ins that allow expansion to provide customized and specific processing and filtering capability that is associated with a corresponding social activity.

19. A computer readable storage device with an executable program stored thereon, wherein the program instructs a processor to perform:

processing input messages iteratively, each obtained input message having unstructured content characterizing at least one aspect of a corresponding time limited, social activity by:

extracting context information from the unstructured content of the obtained input message to determine whether the corresponding social activity is currently being monitored;

creating a new social activity summary if the corresponding social activity is not currently being monitored, otherwise, associating the obtained input message with the corresponding social activity;

converting the unstructured content from the obtained input message, the unstructured content characterizing at least one aspect of the corresponding social activity and aggregating the extracted unstructured content with any previously extracted unstructured content associated with the corresponding social activity;

generating summary information that summarizes the corresponding social activity based upon at least one of:
- selected information from the aggregated content associated with the corresponding social activity, and
- derived information from content based assumptions utilizing knowledge of the corresponding social activity and selected content associated with the corresponding social activity;

applying context aware filtering so as to eliminate redundant input messages associated with the social activity by consolidating the unstructured content of the redundant messages that represents the same information;

sequencing the filtered summary information into a chronology of the social activity independent of the order in which the input messages are received; and generating a collaborative chronicle of the social activity based upon the sequenced and filtered summary information.

20. The computer readable storage device according to claim 19, wherein generating summary information further comprises summarizing each social activity according to event topics that are context relevant to the subject of the social activity.

21. The computer readable storage device according to claim 19, wherein the program further instruct the processor to:
- building, dynamically, collaborative chronicles of multiple social activities identified by a community of users, and
- building the content of the summarized social activities based upon input messages derived from a community of observers of the associated social activities.

22. The computer readable storage device according to claim 19, wherein the program further instructs the processor to perform: sending updates to identified processing devices based upon trigger conditions identifying a change to an associated social activity.

* * * * *